Figure 1:
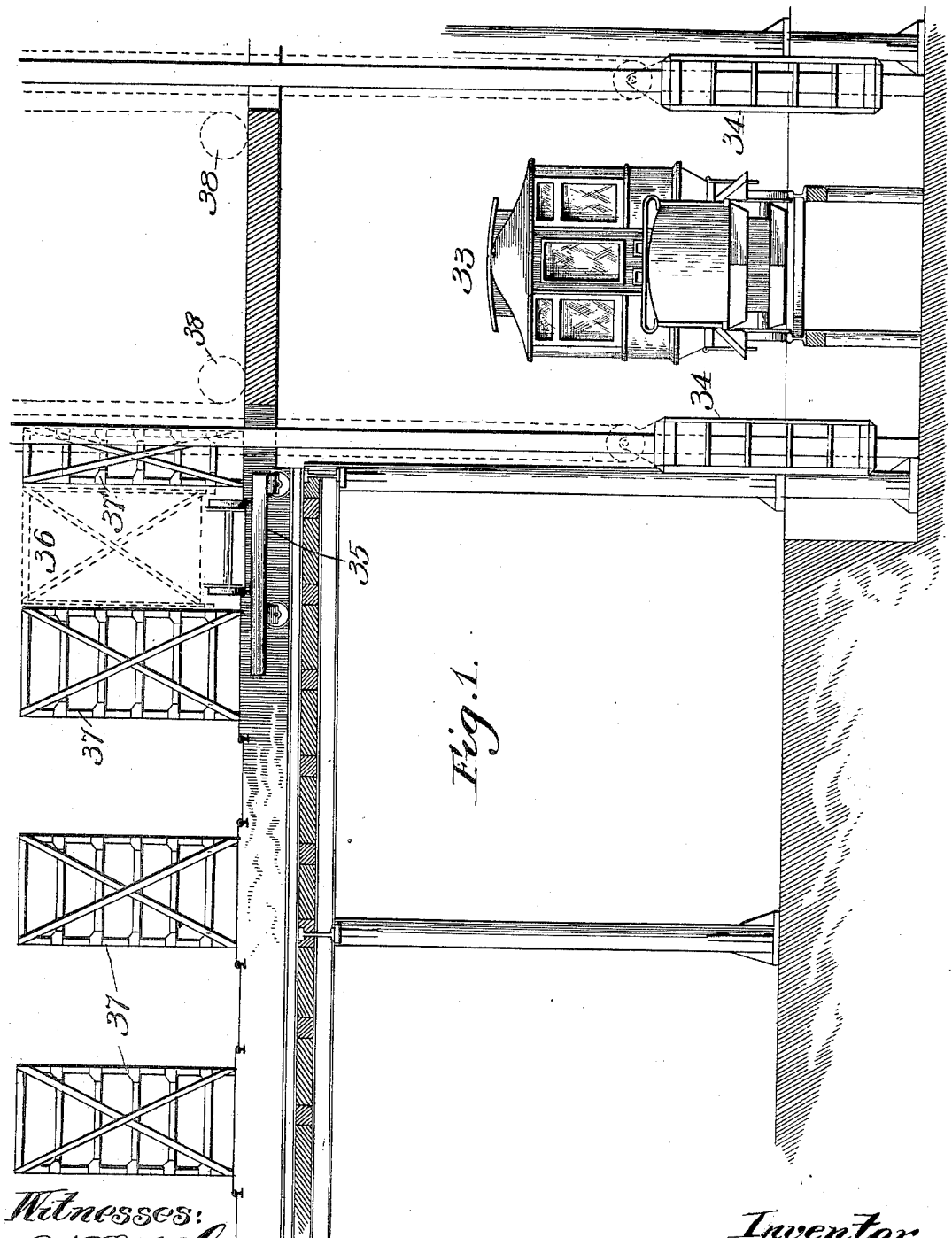

No. 668,109. Patented Feb. 12, 1901.
C. O. MAILLOUX.
STORAGE AND TRANSFER SYSTEM FOR ELECTRIC BATTERIES.
(Application filed Apr. 24, 1900.)
(No Model.) 14 Sheets—Sheet 1.

Witnesses:
J. B. McGirr.
Otto Greenberg

Inventor:
C. O. Mailloux
By H. E. Townsend
Attorney

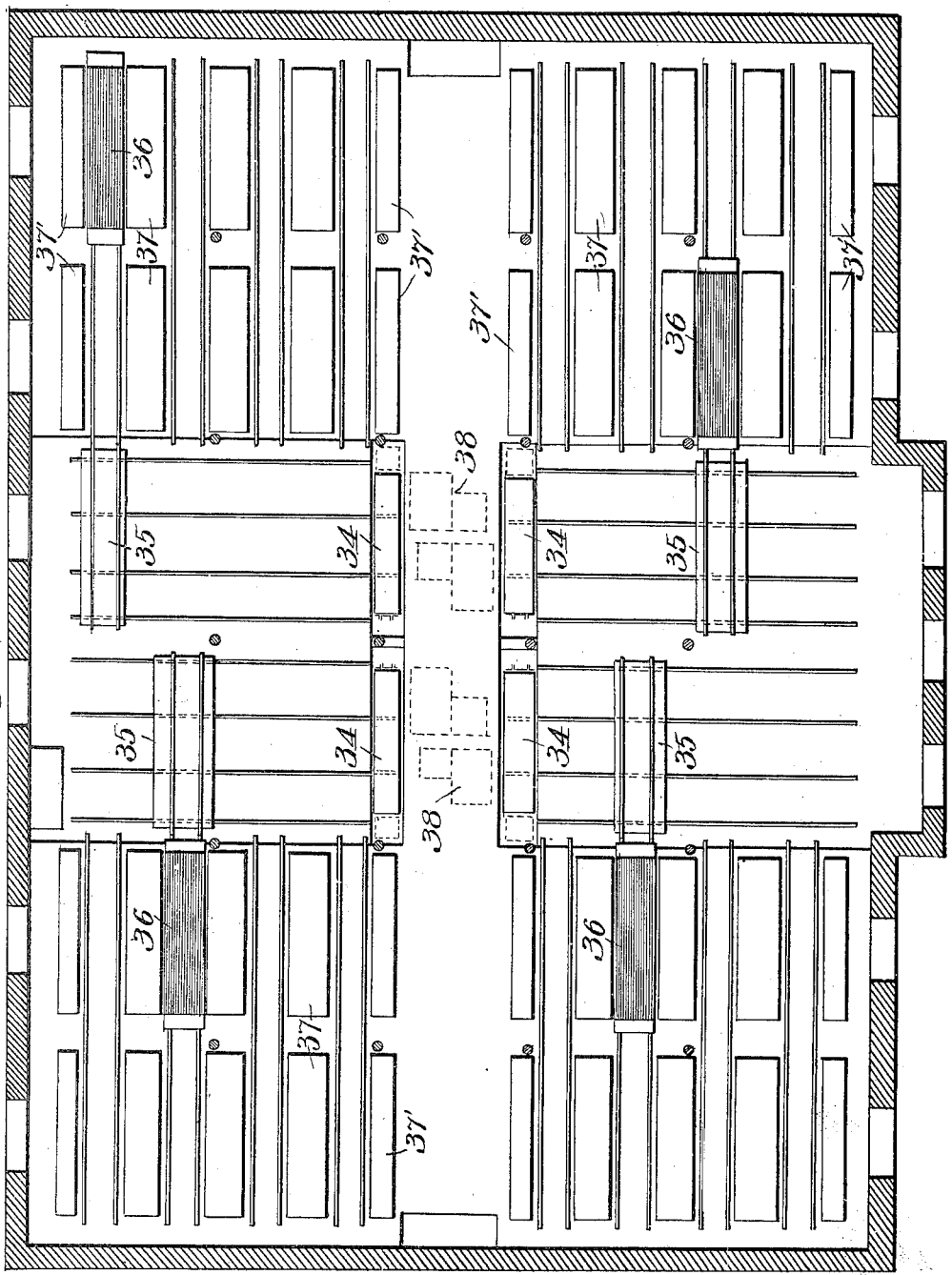

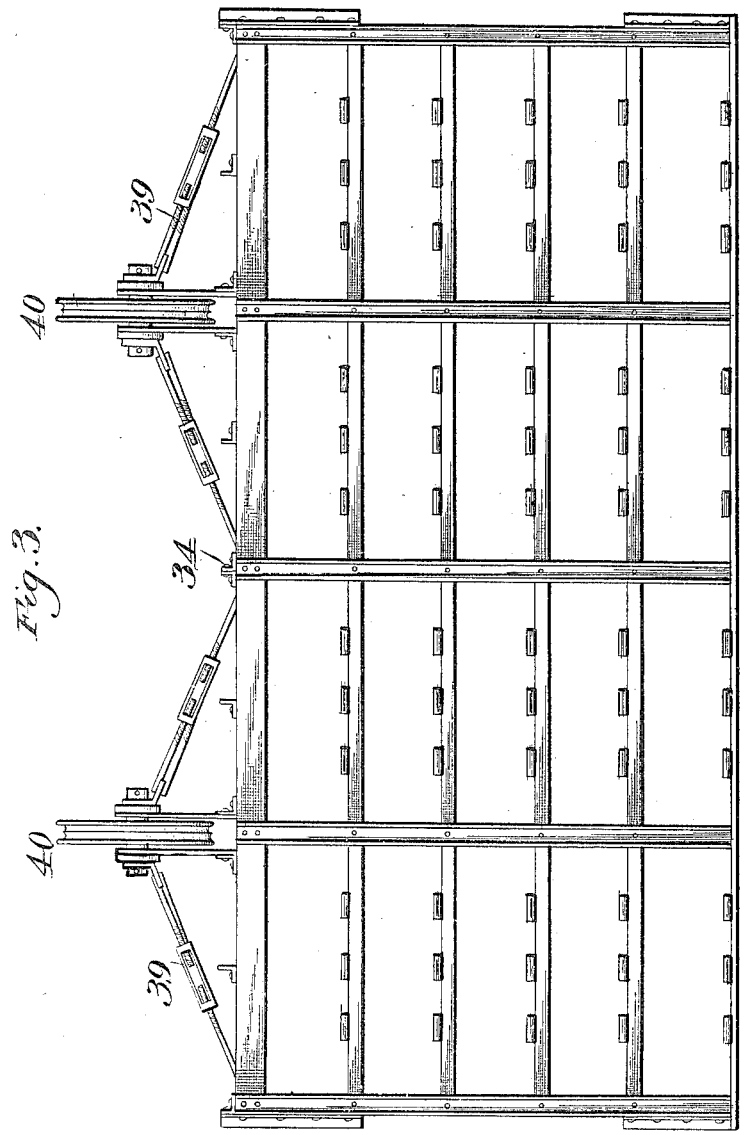

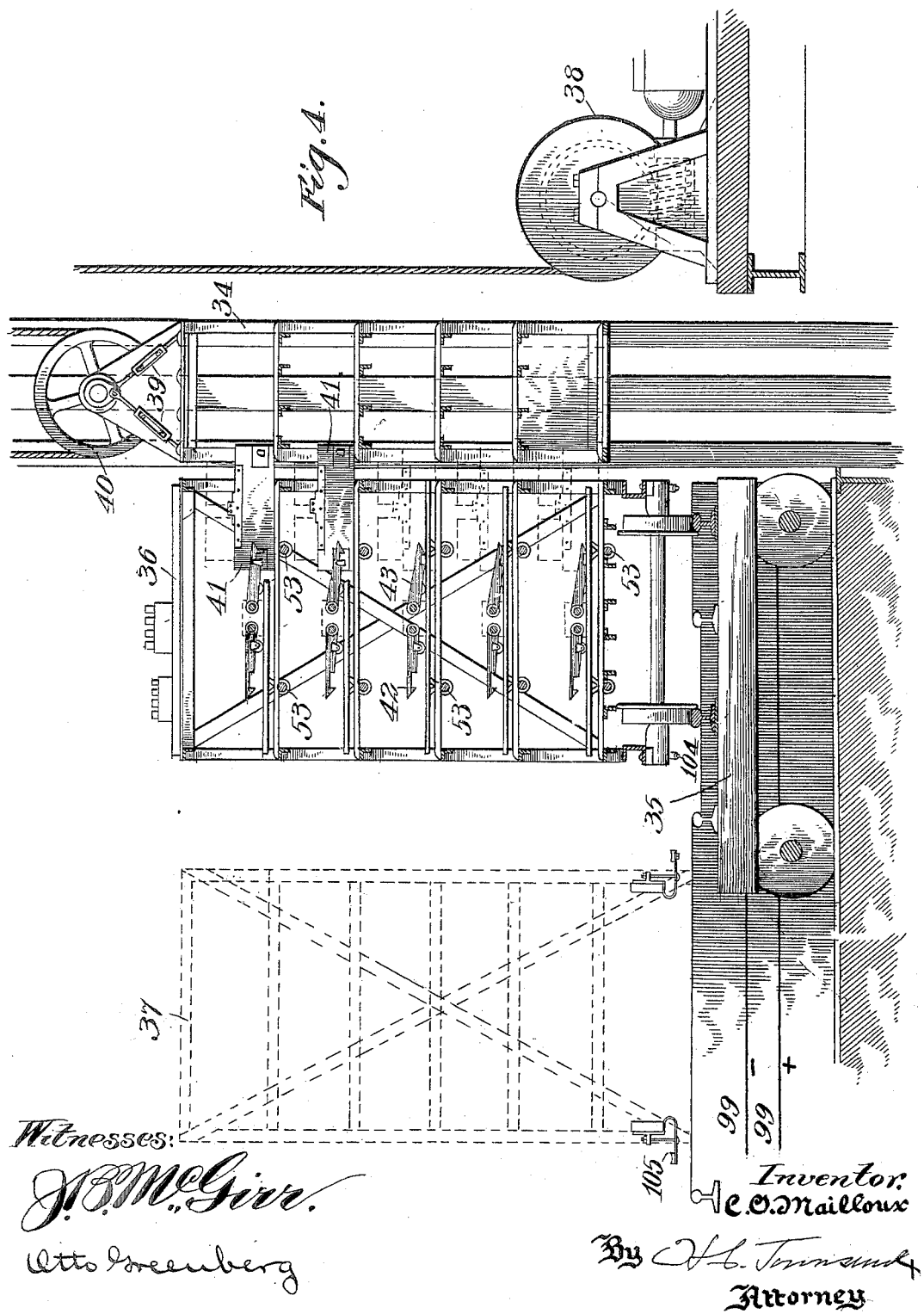

No. 668,109. Patented Feb. 12, 1901.
C. O. MAILLOUX.
STORAGE AND TRANSFER SYSTEM FOR ELECTRIC BATTERIES.
(Application filed Apr. 24, 1900.)
(No Model.) 14 Sheets—Sheet 5.
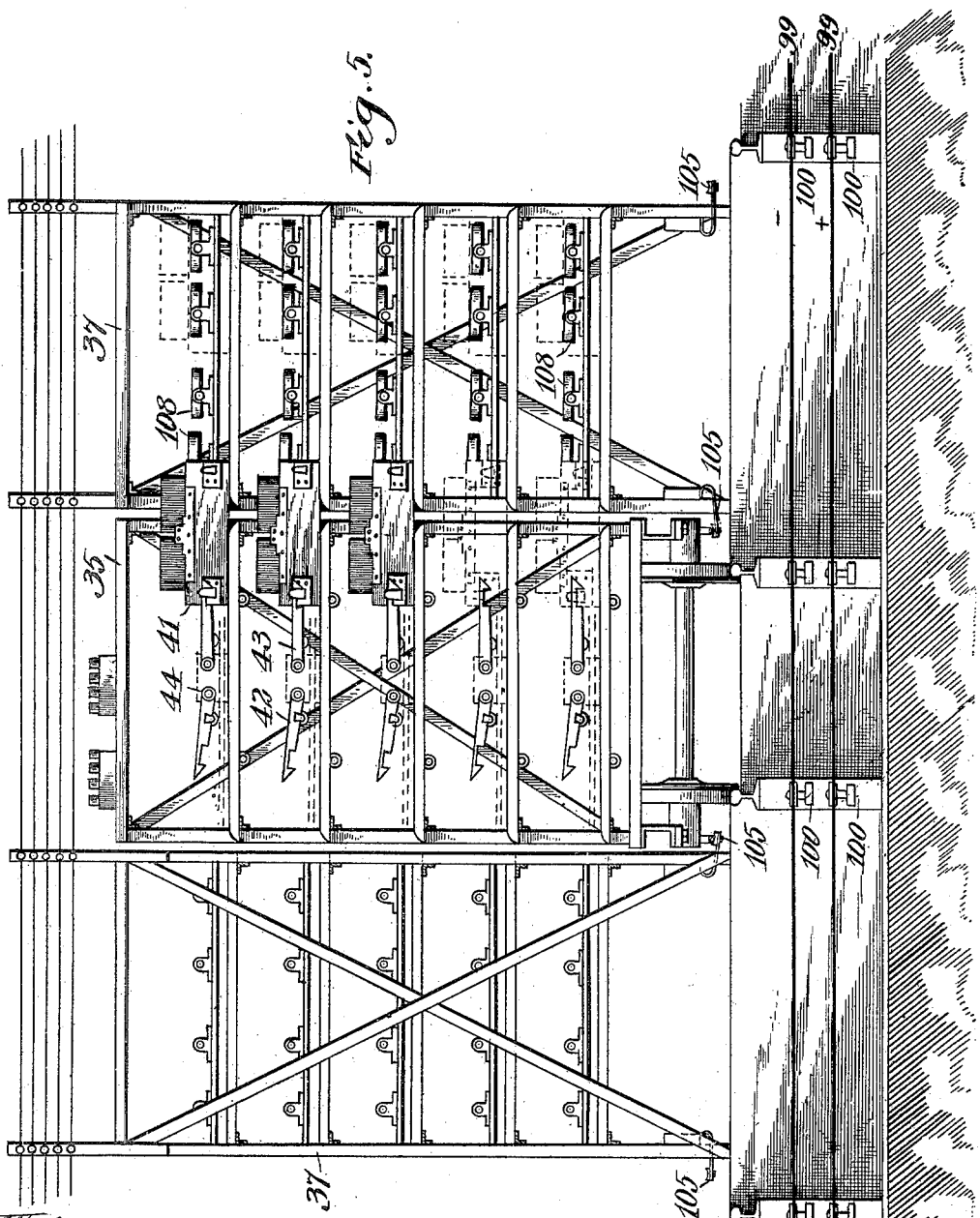

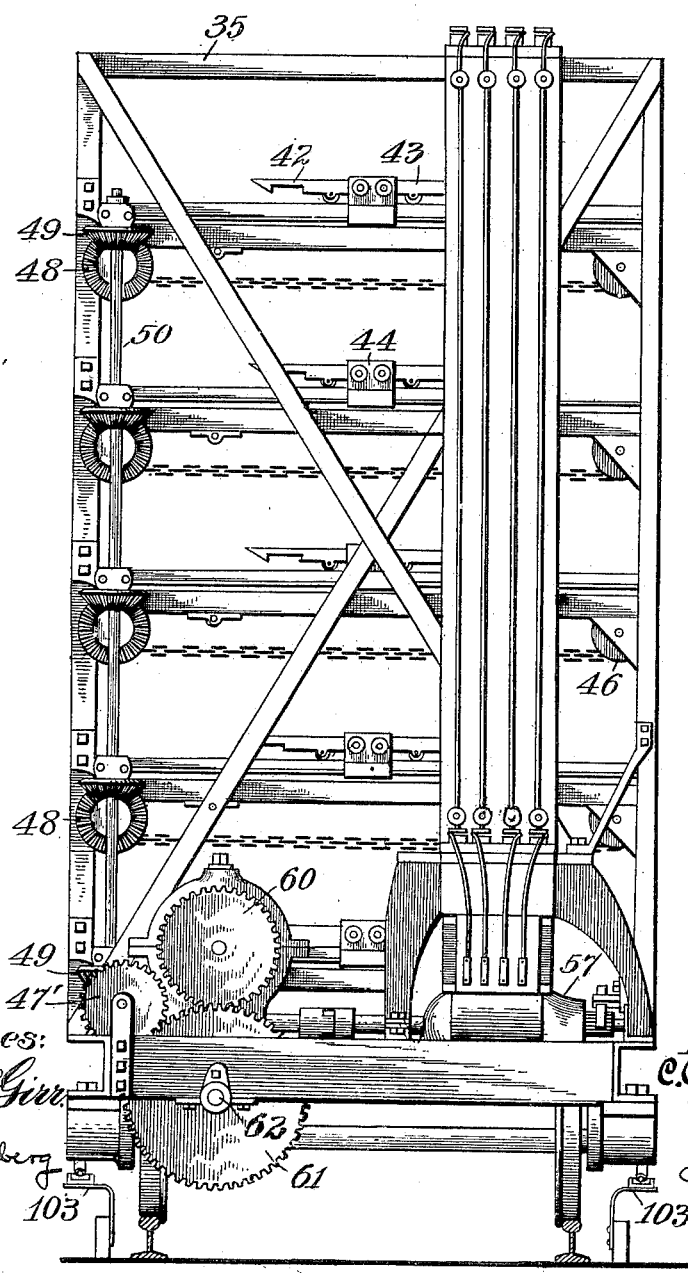

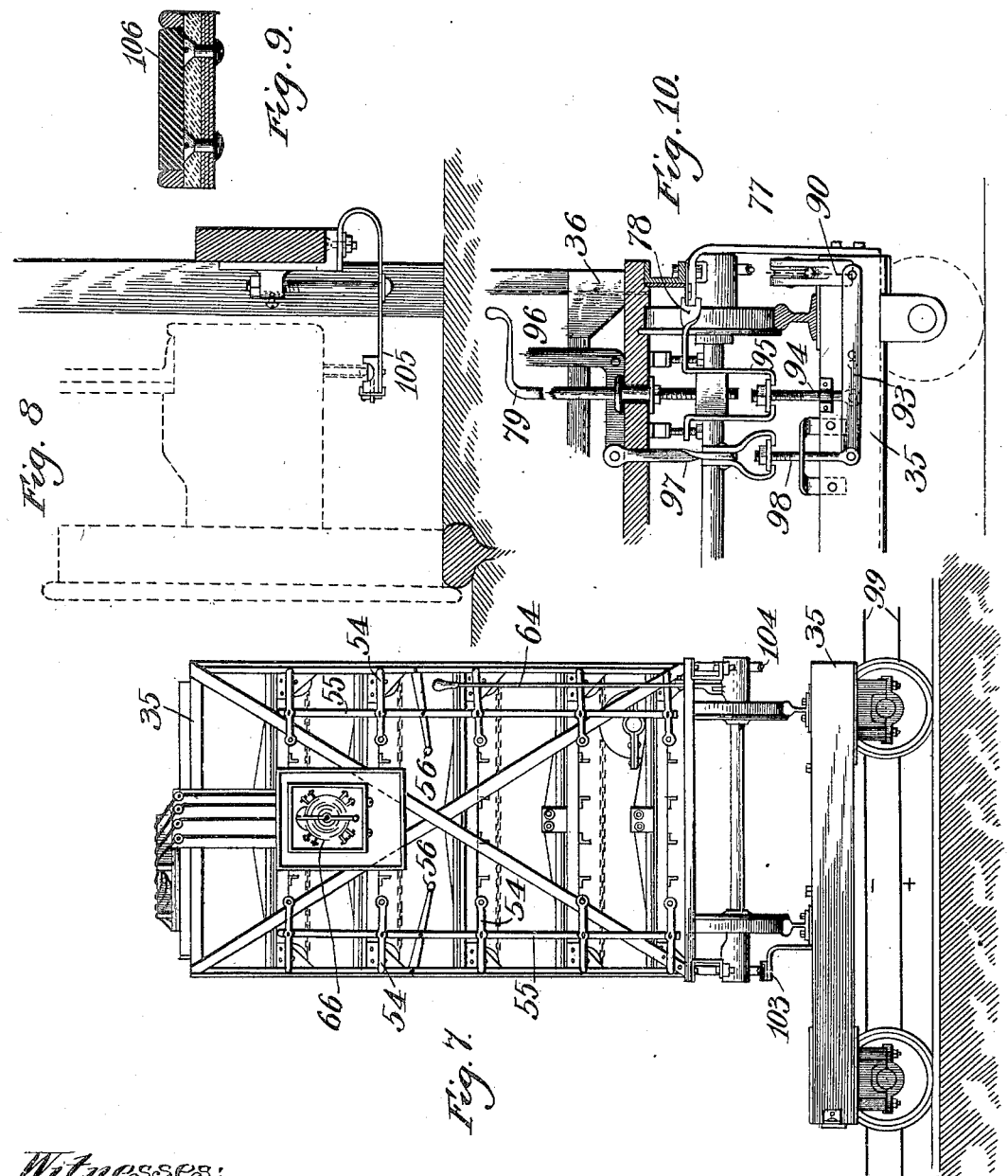

No. 668,109. Patented Feb. 12, 1901.
C. O. MAILLOUX.
STORAGE AND TRANSFER SYSTEM FOR ELECTRIC BATTERIES.
(Application filed Apr. 24, 1900.)
(No Model.) 14 Sheets—Sheet 8.
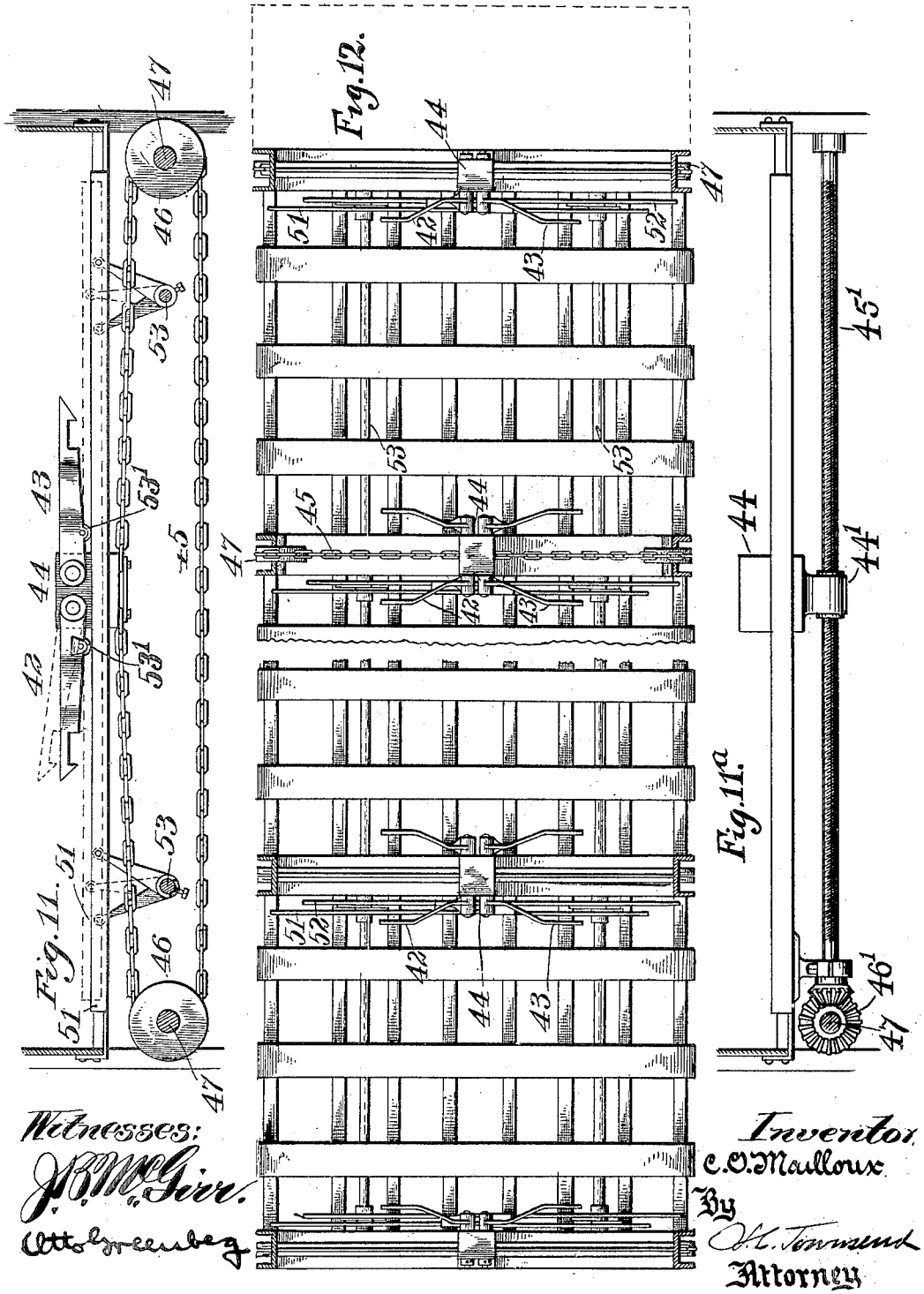

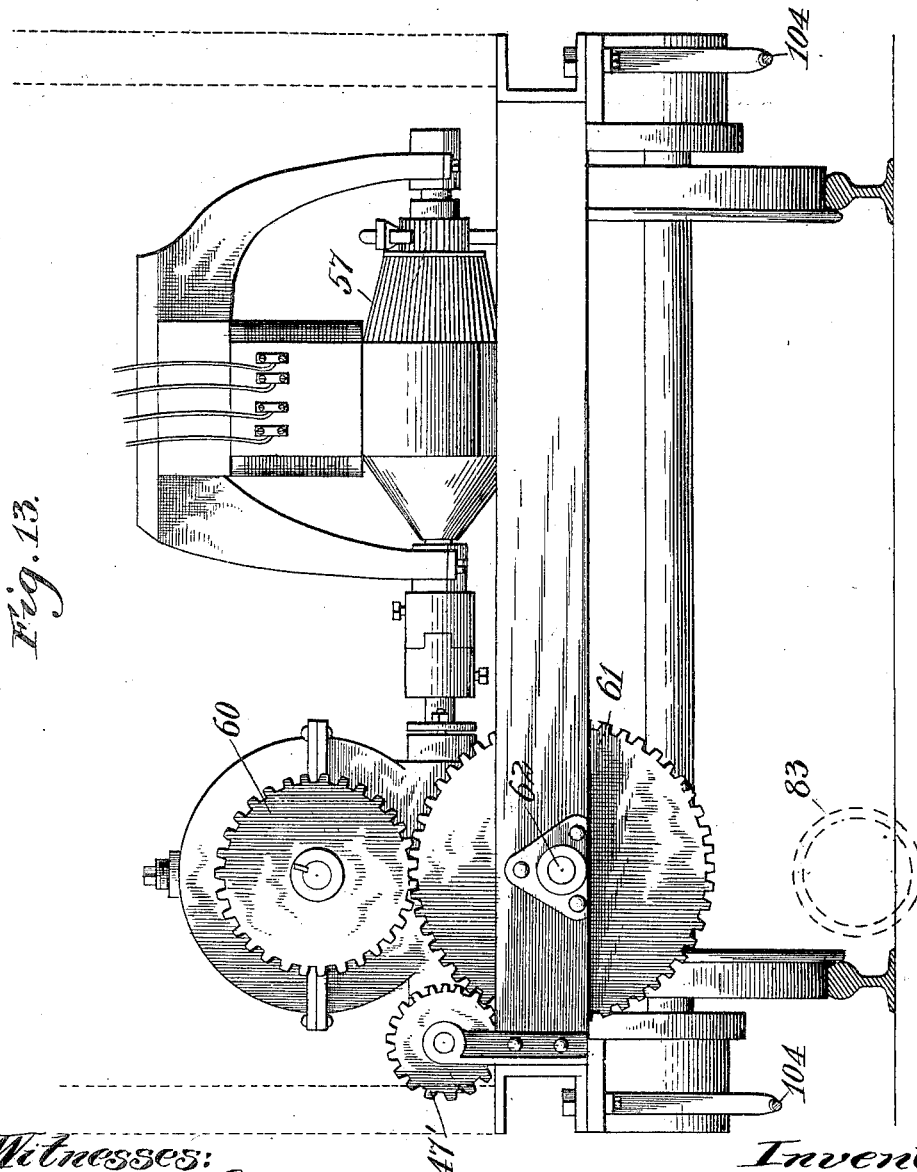

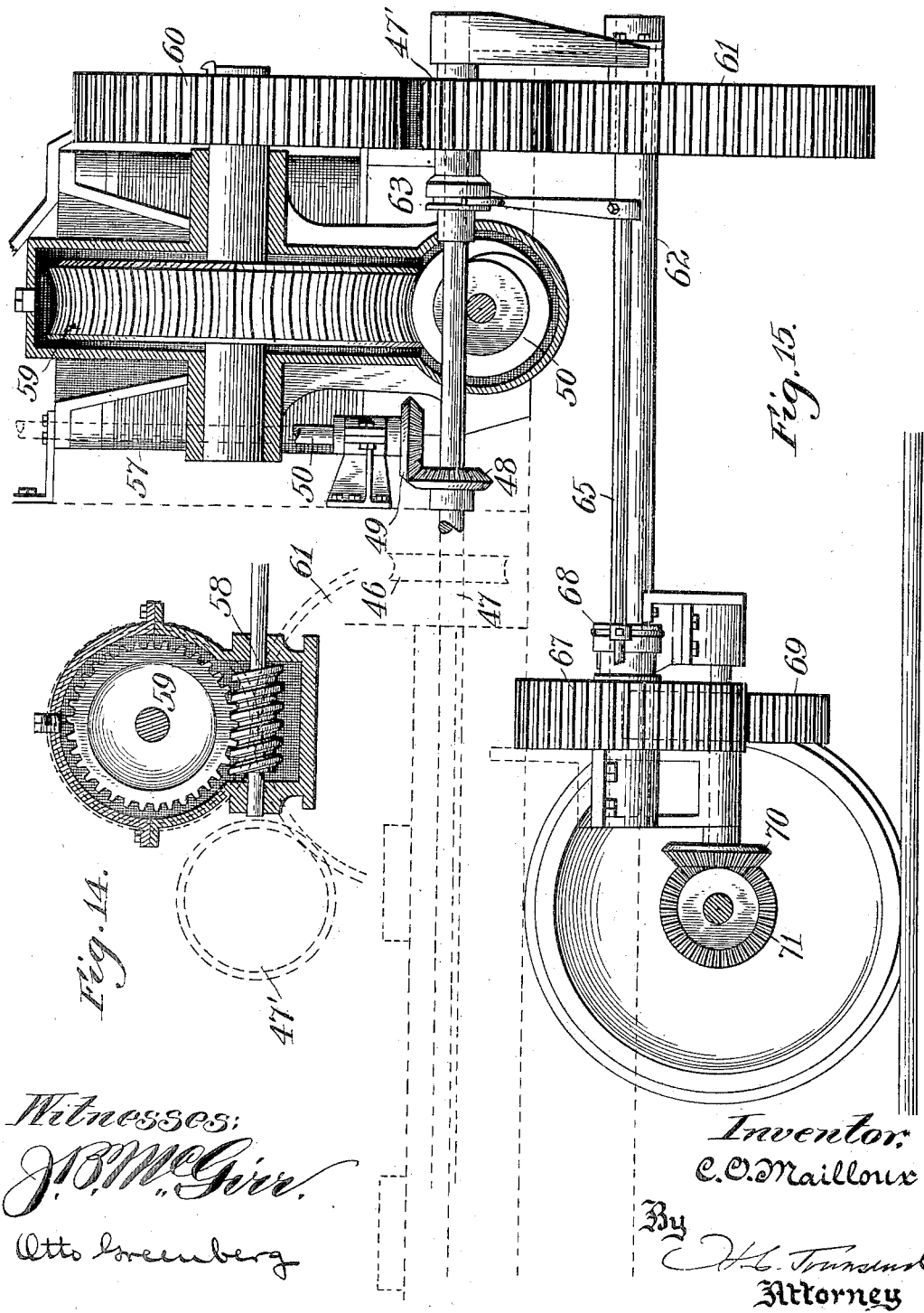

No. 668,109. Patented Feb. 12, 1901.
C. O. MAILLOUX.
STORAGE AND TRANSFER SYSTEM FOR ELECTRIC BATTERIES.
(Application filed Apr. 24, 1900.)
(No Model.) 14 Sheets—Sheet 11.
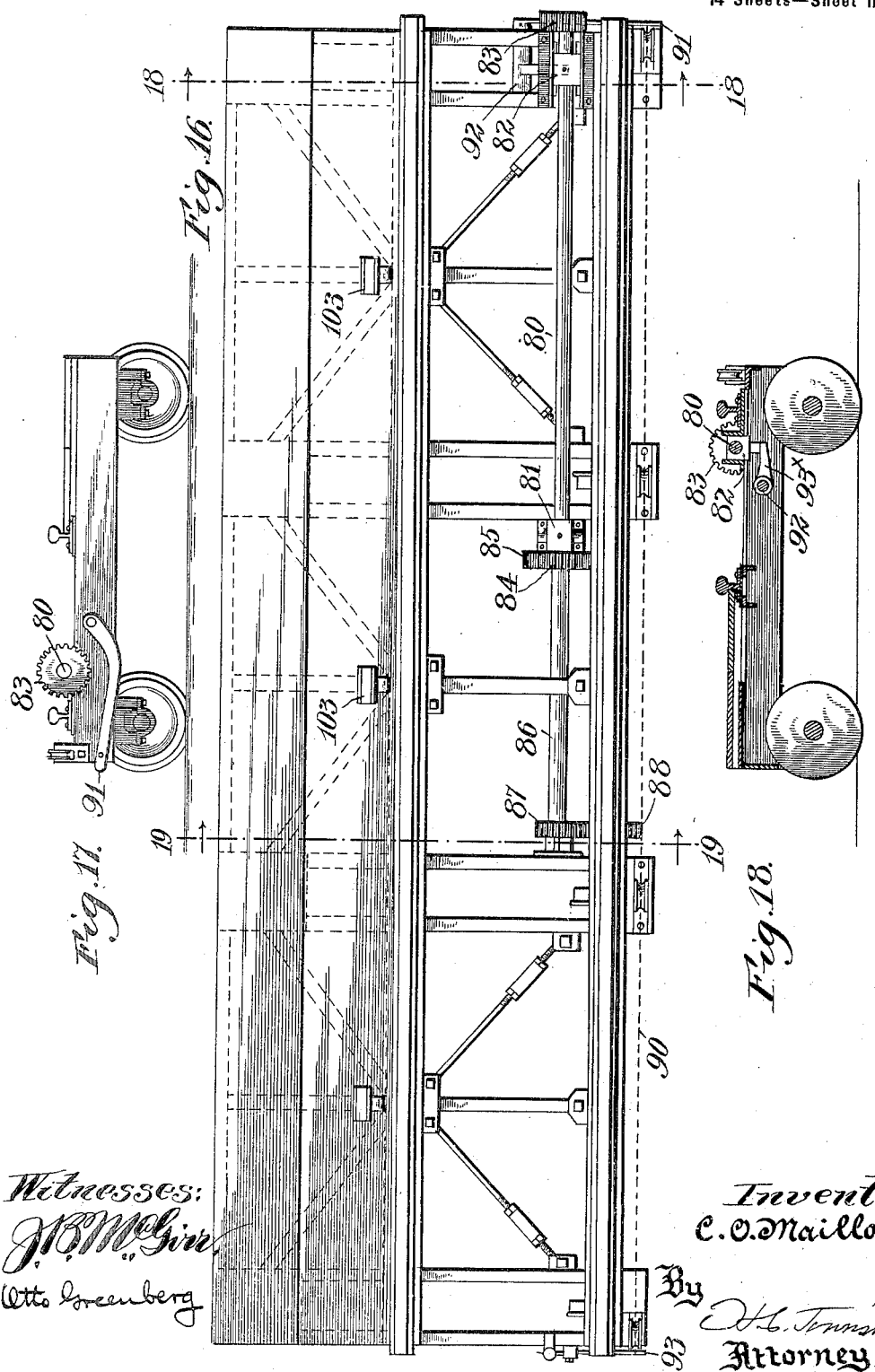

No. 668,109. Patented Feb. 12, 1901.
C. O. MAILLOUX.
STORAGE AND TRANSFER SYSTEM FOR ELECTRIC BATTERIES.
(Application filed Apr. 24, 1900.)
(No Model.) 14 Sheets—Sheet 12.
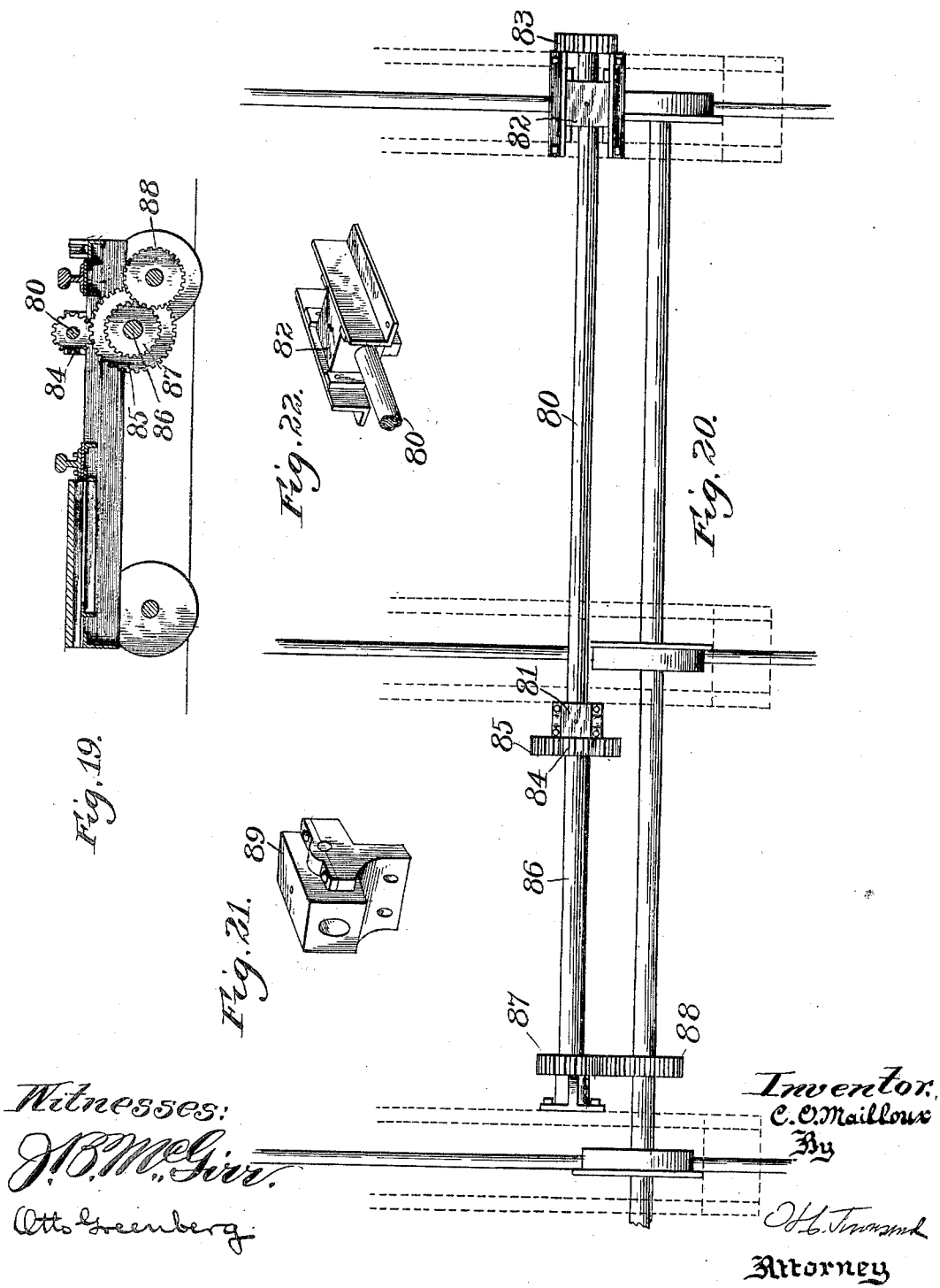

No. 668,109. Patented Feb. 12, 1901.
C. O. MAILLOUX.
STORAGE AND TRANSFER SYSTEM FOR ELECTRIC BATTERIES.
(Application filed Apr. 24, 1900.)
(No Model.) 14 Sheets—Sheet 13.
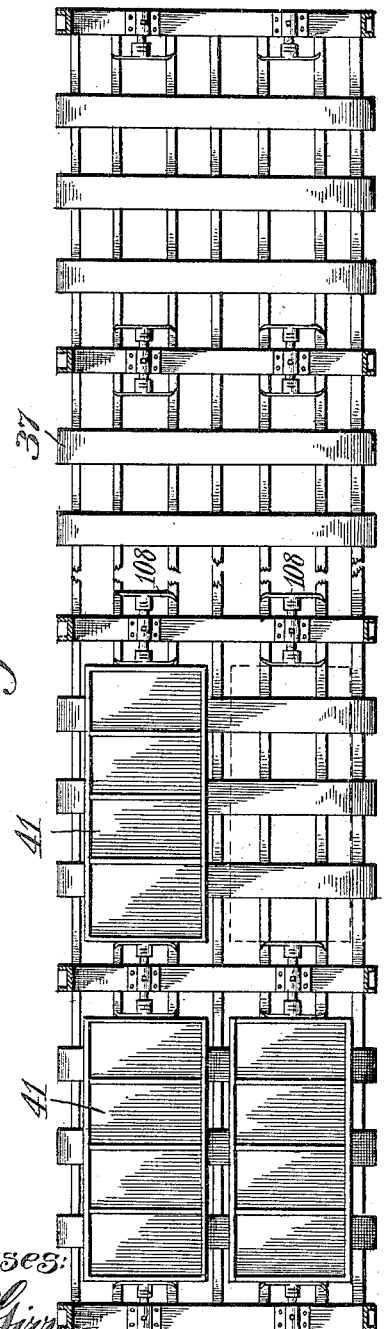
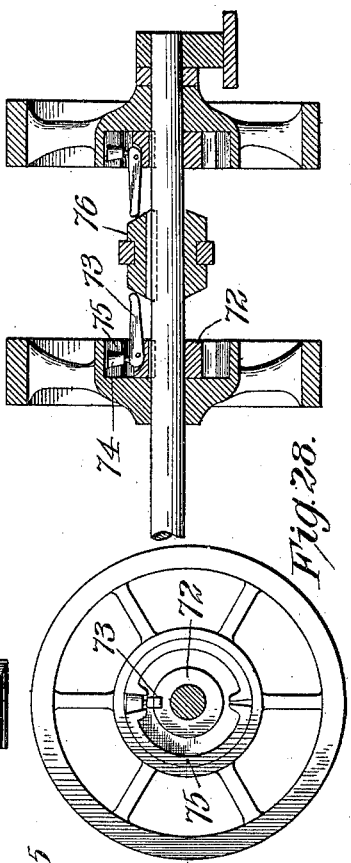
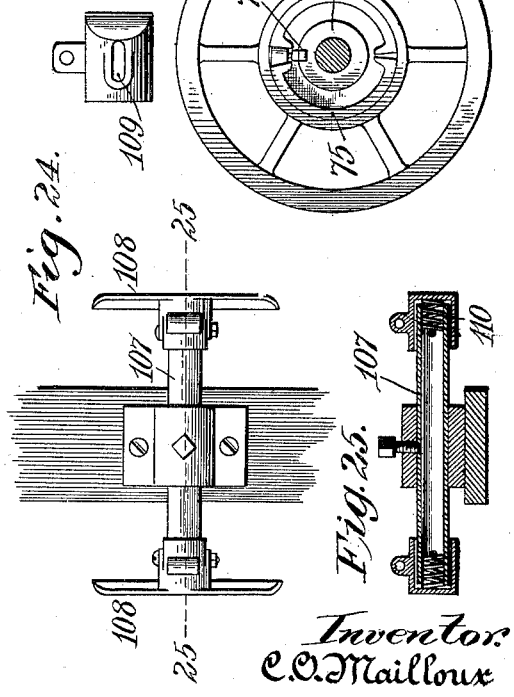
Witnesses:
Inventor:
C. O. Mailloux
By O. H. Townsend
Attorney

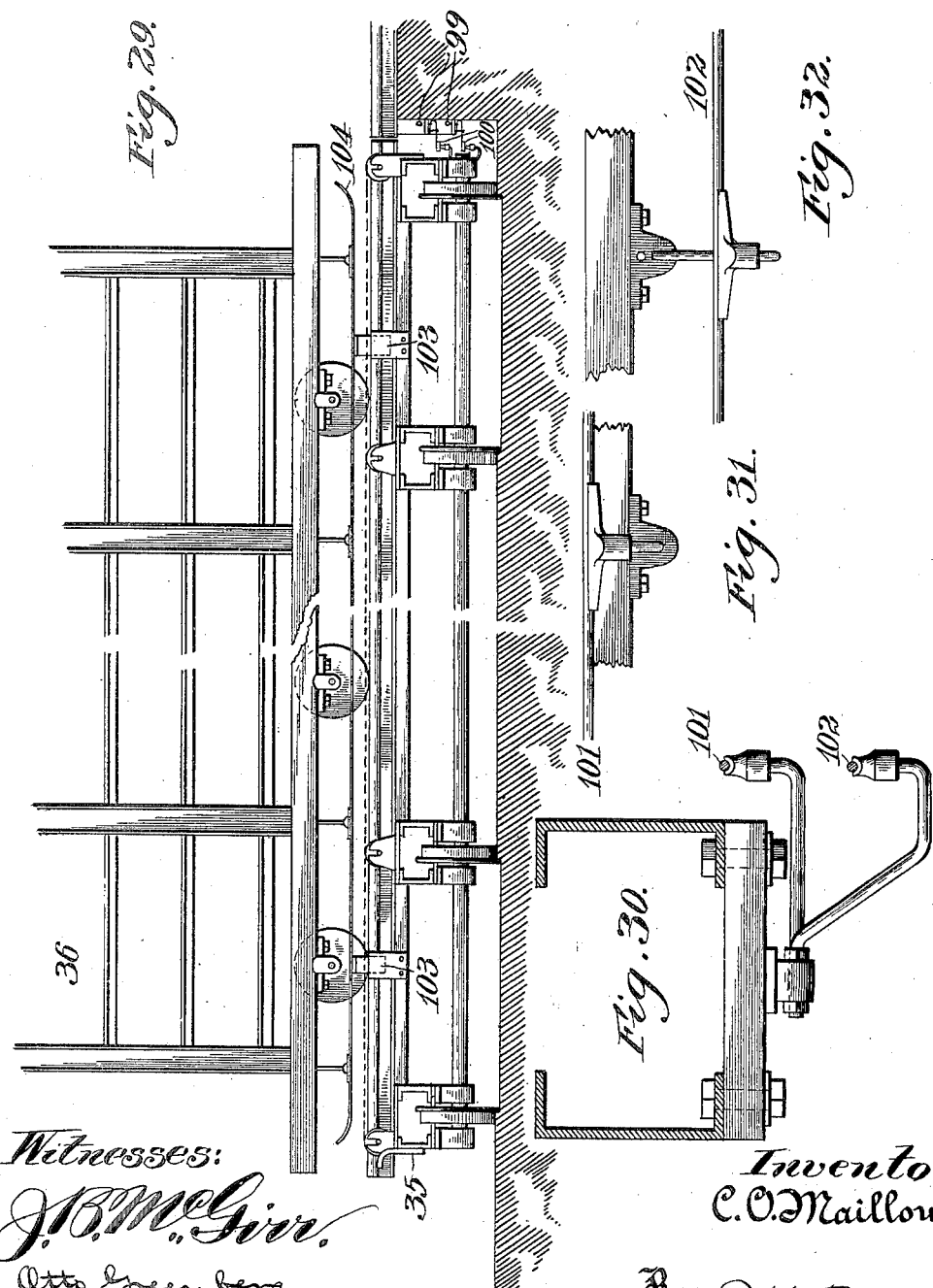

UNITED STATES PATENT OFFICE.

CYPRIEN O. MAILLOUX, OF NEW YORK, N. Y.

STORAGE AND TRANSFER SYSTEM FOR ELECTRIC BATTERIES.

SPECIFICATION forming part of Letters Patent No. 668,109, dated February 12, 1901.

Application filed April 24, 1900. Serial No. 14,085. (No model.)

*To all whom it may concern:*

Be it known that I, CYPRIEN O. MAILLOUX, a citizen of the United States, and a resident of New York city, in the county of New York and State of New York, have invented certain new and useful Improvements in Storage and Transfer Systems for Electric Batteries, of which the following is a specification.

This invention relates to a system for handling electric batteries in a charging-station; and its principal object is to facilitate the transfer of batteries to and from the charging-rooms and a place whence they can be readily shifted into and out of vehicles whose motive power is to be derived therefrom.

To this end the invention consists in the construction, combination, and arrangement of parts and apparatus hereinafter fully described, and set forth in the claims.

In the accompanying drawings, which form a part of this specification, Figure 1 represents in sectional elevation a portion of a charging-station equipped with my invention. Fig. 2 is a horizontal section thereof, showing the arrangement on the second floor of the station. Fig. 3 is a side elevation of the battery lift or elevator. Fig. 4 is a sectional elevation of one of the transfer-cars or moving battery-racks, together with a like view of the elevator-car, battery-trays being shown in transit from one to the other. Fig. 5 is a similar view of the transfer-car in position between two charging-racks, battery-trays being also here shown in transit from one of the racks onto the car. Fig. 6 is an end elevation of a transfer-car-moving rack. Fig. 7 is an elevation of the opposite end of the transfer-car, the same being shown in position upon the transfer-table. Fig. 8 is a detail of the manner in which current is transmitted to the transfer-car. Fig. 9 is a transverse section through one of the devices from which current is taken by said car. Fig. 10 is a detail view showing a portion of the transfer-car and transfer-table and coöperating mechanism on each. Fig. 11 is a sectional view through a portion of the transfer-car, showing in side elevation the apparatus by which a battery or battery-tray is shifted. Fig. 11ª is a similar view showing a modification in said apparatus. Fig. 12 is a horizontally-sectional view of the transfer-car, showing this shifting mechanism in plan. Fig. 13 is an end view of the platform of the transfer-car, showing, on an enlarged scale, the motor mechanism used in this transfer system. Figs. 14 and 15 are sectional details through the power-transmitting gearing of said mechanism. Fig. 16 is a plan of the transfer-table. Fig. 17 is an end elevation of said table. Fig. 18 is a transverse vertical section through said table, taken in the plane indicated by the line 18 18 in Fig. 16. Fig. 19 is a vertical transverse section through said table, taken in the plane indicated by the line 19 19 in Fig. 16. Fig. 20 is a plan of a portion of the running-gears of the transfer-table. Figs. 21 and 22 are detail views in perspective of portions of the mechanism shown in Fig. 20. Fig. 23 is a horizontal section through one of the charging-racks, showing trays therein in plan and the electrical contacts with which said trays engage. Fig. 24 is an enlarged view of one pair of said contacts. Fig. 25 is a vertical section through said pair of contacts, taken on the line 25 25 of Fig. 24. Fig. 26 is an end view of one of the contacts. Figs. 27 and 28 are details of a modification of the clutch device forming a part of the motor mechanism. Fig. 29 is a side elevation of the transfer-car in position upon the transfer-table and illustrates the mode of transmitting current to the table and thence to the car. Figs. 30, 31, and 32 are detail views, on an enlarged scale, showing the way in which the contact-shoes of the transfer-table are mounted.

When ground space has to be economized, as in the large cities, it is desirable in a battery-charging station to have the charging-rooms and storage-station in one or more of the stories above the ground floor. The present system is designed to facilitate the handling, charging, and storing of batteries under these circumstances and is intended to be used in connection with the battery-transfer system disclosed in my application for patent, Serial No. 791,922, filed December 29, 1899.

In the charging-station equipment involving my invention the vehicle, whose power is derived from electric batteries, is run into the charging-station to a definite position therein. Its batteries are then shifted onto a battery-carrier, which may be moved by any suitable means into position, whence its load may be shifted to a transfer-car. This car is preferably carried by a transfer-table, whereby it may be moved to any one of the several tracks or routes between series of charging-racks, where it may deposit its load and from another rack receive another load and carry the same over the route just outlined to the battery-carrier, whence said load will be transferred to the vehicle. The preferred mode of transfer between the vehicle and carrier is fully set forth in the application above referred to. This application will deal simply with the system of handling between the battery-carrier and the charging-racks. In this system motive power of various kinds may be employed; but obviously electric power is preferable, and an important part of my invention resides in adapting one motor mechanism to shifting the batteries between the battery-carrier and the transfer-car and between the transfer-car and the charging-racks and utilizing the same motor for driving the transferred car and also for driving the transfer-table, all of which will be hereinafter fully described.

In Fig. 1 an electric vehicle, here shown at 33 as a street-car, is illustrated in a charging-station. At either side of the vehicle are seen elevator-cars or battery-carriers, (indicated at 34.) On the second floor of the charging-station is seen the transfer-table 35 and upon it the transfer-car or moving rack 36, the rack on said car being shown in dotted lines between a double charging-rack 37 and a single charging-rack 37'.

In Fig. 2 the positions of the charging-racks are clearly indicated and between them the tracks or ways for the transfer-car. In this view four transfer-cars are illustrated between the various racks, and four transfer-tables are also shown upon tracks or ways running from the wells or shafts of the battery lifts or carriers. The motors for said lifts are indicated in dotted lines at 38.

The battery-lift or elevator-car (shown in side elevation in Fig. 3) is provided with four vertical sections, each intended to carry enough batteries or battery-trays to fill one side of a transfer-car or charging-rack, and is provided with suitable guys or braces 39, whereby it may be kept true and properly supported from the lifting-cables which pass over the drums 40.

In the transfer-cars suitable shelves are provided for carrying the battery-trays. These trays are represented at 41.

Means of various sorts may be provided for shifting the battery-trays onto and off from the transfer-car. Such means may consist of hooks 42 43, which are pivoted in pairs upon reciprocating blocks 44. These blocks may be made to reciprocate by means of chains, as 45, and connected to opposite sides thereof, which are arranged transversely of the transfer-car and pass around chain-wheels 46, which in turn are mounted upon shafts 47, suitably journaled at the sides of the transfer-car. Upon the ends of these shafts 47, at one side of the car, are mounted bevel-gears 48, which mesh with corresponding gears 49 upon a vertical shaft 50. This shaft 50 receives its rotation from that one of the bevel-gears 48 which is upon the lowermost shaft 47, which shaft is provided at its outer end with a spur-gear 47' in the motor-train of gears. By the rotation of shaft 50 the horizontal shafts 47 upon the transfer-car are rotated and the sliding blocks 44 made to travel in either direction across the car, depending upon the direction in which the shaft 50 is rotated. From this it will be seen that the hooks 42 or 43 may be advanced either into the battery-carrier 34 or into the charging-racks 37 and engaged with suitable ears or projections upon the sides of the battery-trays, as clearly seen in Figs. 4 and 5.

Instead of reciprocating the block 44 by means of the chains 45 it may be reciprocated by means of a screw, as 45', Fig. 11ª, said screw passing through a nut 44' on the block 44 and being geared by a pair of bevel-gears to the shaft 47.

In loading the transfer-car the batteries first taken onto it will be shifted across the car to the farther side, thereby leaving room on the near side for the next load presented to it by the battery-carrier 34. In this act of shifting battery-trays it is necessary to provide some means for throwing the hooks 42 or 43 out of the path of the ears or projections on the battery-trays when it is desired to allow said hooks to pass trays already located upon the transfer-car or the charging-racks. One way of doing this is illustrated. It consists in providing upon the transfer-car horizontal bars or rods 51 52, which may be raised or lowered in a manner to move the hooks on their pivots and to elevate the beaks thereof out of the path of the ears on the battery-trays or to lower said beaks, so that they may engage said ears. These horizontal rods may be raised or depressed in any suitable way, preferably by means of rock-shafts 53, provided with arms pivoted to said bars. The hooks also may be provided with suitable rollers 53', as indicated in Fig. 11, for engaging said bars. All of the bars 51, controlling the hooks 43 on one side of the car, may be moved simultaneously, or those on any one shelf may be moved independently of any of the other shelves. To this end each rock-shaft 53 is provided, as shown in Fig. 7, with a hand-lever 54. All these levers 54 may be connected by a link 55 when it is desired to operate them simultaneously. The connection of levers 54 with said link may be made by a removable pin. For the simultaneous operation of the levers 54 a lever, as 56, may be provided, which will be suitably pivoted to the car and to the link 55.

In Fig. 11 hook 43 is shown in the normal position and hook 42 is shown in full lines in the normal position and in dotted lines in the elevated position, the bar 51 having been moved up by the rotation of the shaft 53. In this elevated position hook 42 will ride past the ears upon the battery-trays. The motor from which the reciprocation of these hooks is produced is shown at 57. Its shaft is provided with a worm 58, which meshes with worm-wheel 59. On the shaft of the worm-wheel is a pinion 60, which may be considered the motor-gear to the power-train. This gear meshes with gear 61 upon the counter-shaft 62. Meshing with gear 61 is the idle gear 47' upon the lowermost shaft 47, above referred to.

When it is desired to operate the transfer-hooks 42 43, the clutch 63 upon shaft 47 is moved to engage the gear 47'. The movement of this clutch is effected by a suitable lever, as 64. (Seen in Fig. 7.) This lever is at the end of the car opposite to that upon which the motor is mounted and is connected to said clutch by means of the rod 65. This clutch may be of any suitable form, the details thereof not being shown in the drawings, and when it is engaged with the gear 47' the direction in which the hooks are moved will depend upon the movement of the motor. Said motor may be made to move in either direction desired by means of an ordinary reversing-switch, (indicated at 66.) A platform is preferably provided for carrying the operator upon the end of the transfer-car upon which the controlling-levers are mounted. The lever 64, aside from controlling the shifting of the batteries, also controls the movement of the transfer-car.

It will be seen by reference to Fig. 15 that the counter-shaft 62 has upon it an idler 67, which may be engaged by the clutch 68, and it meshes with gear 69, upon whose shaft is a beveled pinion 70, which meshes with a pinion 71 upon an axle of the transfer-car. A movement of the rod 65 to the left by lever 64 will disengage the clutch 63 from its gear 47', and a further movement of said lever will engage clutch 68 with its gear 67. Then upon starting the motor 57 power will be transmitted to the axle of the transfer-car and said car moved in the desired direction, its direction being controlled by the reversing-switch 66, as in the instance above cited. When the lever 64 is in its vertical or intermediate position, both clutches 63 and 68 will be disengaged from their respective gears. These clutches may, if desired, be of the form shown in Figs. 27 and 28, wherein a collar, as 72, may be keyed to the shaft, and in this collar a lever, as 73, may be pivoted. Upon the inner end of said lever is secured a wedge, as 74, lying between the ends of clamping-rings 75, which are seated in the hub of the wheel, which wheel is normally idle upon the shaft. For operating the lever 73 a sliding collar 76 is mounted upon the shaft. This collar is coned at its end to engage the lever 73. By throwing the end of said lever outwardly the wedge 74 will force the parts of the rings 75 outwardly and into frictional engagement with the seat in the hub of the wheel. When two trains of gears are to be operated from the same shaft, a wheel with a similar clutch may be mounted at the opposite side of the sliding collar 76. It will be seen that by the movement of said collar in one direction one wheel will be engaged with the shaft and by the movement of said collar in the opposite direction the other wheel will be engaged with the shaft, and when said collar is in intermediate position both wheels may be idle upon the shaft.

It is well to provide some means for locating the transfer-car in a definite position upon the transfer-table and to fix it in such position before the moving table. It is also necessary to thus locate the transfer-car upon the table in order that it may be in proper alinement with the battery-carrier in loading or unloading. This positive location of the transfer-car may be accomplished in various ways. One such way is illustrated in Fig. 10, wherein a projection, as 77, is shown upon the transfer-table and a vertically-movable stop 78 is shown as mounted upon the transfer-car. In this figure said stop is shown in engagement with the projection 77. To thus engage said stop, the crank 79 may be turned, thereby raising or lowering the stop, as desired. This crank may also be used in coupling the motor on the transfer-car with the driving-train of the transfer-table. Said driving-train consists of a shaft 80, Fig. 16, journaled at one end in a pivoted bearing 81 and at the other end in a vertically-movable bearing 82. This shaft carries at its free end a pinion 83, which by the movement of the shaft 80 is made to engage with the pinion 61 on the transfer-car. Upon the opposite end of the shaft 80 is a pinion 84, meshing with a pinion 85 upon the counter-shaft 86, which shaft has upon its opposite end a pinion 87, meshing with a pinion 88 upon the axle of the transfer-table. By mounting the pivotal journal 81 of the shaft 80 close to the gears 84 and 85 only a very slight vertical movement is given the pinion 84 when the pinion 83 is moved up into mesh with pinion 61. The pinion 83 may be moved into mesh with gear 61 in any suitable way. To provide for doing this from the platform of the transfer-car, a chain or cable 90 may be carried along the side of the transfer-table over suitable pulleys and connected at the farther end to a lever 91, which operates the rock-shaft 92, whereon is an arm $93^{\times}$, Fig. 18, extended into engagement with a lug upon the lower side of the sliding bearing 82. This chain or cable 90 is connected, as seen in Fig. 10, to a lever 93. Projecting upwardly from this lever is a link 94, with a head on the upper end, with which hooks 95 may be engaged, said hooks being carried by a vertical movable nut operated by the crank 79. By the operation of this crank after the same has brought the stop 78 into the projection 77 the chain 90 may be drawn and the pinion 83 thrown into mesh with the gear 61. If preferred, the lever 93 may be operated more quickly, as by lever 96, which is coupled to the lever 93 by means of the links 97 and 98, the former having hooks at its lower end for engaging a head upon the latter, whereby the two may be readily engaged or disengaged when the transfer-car runs onto or off from the transfer-table.

Current for the operation of the motor may be supplied in any well-known way. One way for supplying it is indicated in the drawings. It may be supplied to the transfer-table from conductors 99, located along the side of the depression in which the transfer-table runs, said conductors taking their current from any suitable source of supply. From these conductors contacts, as shown at 100 in Fig. 29, are extended at intervals with these engaged suitable rods or collecting-shoes 101 102, mounted upon the side of the transfer-table. The details of said mounting are illustrated in Figs. 30, 31, and 32.

Upon the transfer-table are mounted suitable contacts, as 103, Figs. 7 and 29, from which current may be taken by means of a shoe 104, mounted upon the transfer-car. Suitable connections well known in the art are made from the collector upon the transfer-table to the contacts 103 and from the collector 104 upon the transfer-car to the motor. The motor may obviously be run from batteries carried on the transfer-car, if desired.

In running the transfer-car along the charging-racks current is supplied to the motor through suitable contacts 105, located at intervals along the racks, as indicated in Figs. 4, 5, and 8. These contacts may be of any suitable form, one of the preferred forms being shown in section in Fig. 9, wherein a carbon plate, as 106, forms the contact-surface for the collector upon the car. The battery-racks are provided with suitable contacts for engagement with plates upon the ends of the battery-trays, so that as soon as the trays are shifted into the racks they may immediately be thrown into circuit. One form for these contacts is illustrated in detail in Figs. 23 to 26. They are preferably mounted in pairs and consist, therefore, of a tube 107, upon the ends of which contact-shoes 108 are mounted by means of pins passing through slots 109 therein, springs, as 110, being located between the ends of the sockets on these shoes and pins which are passed through said slots and the tubes 107.

In the operation of this system of handling electric batteries, the transfer-table, with a car thereon, being located at the side of the elevator-car or battery-carrier, the operator will by the movement of rock-shaft 53 throw into operable position the hooks 43 and then by the movement of lever 64 and the switch 66 cause said hooks to travel in the desired direction to effect the shifting of the batteries either to or from the transfer-car. Then when it is desired to move the transfer-table the lever 64 will be thrown into intermediate position, and by the manipulation of the crank 79 or the lever 96 the motor will be thrown into gear with the motor-train of the transfer-table, and by the operation of the switch 66 the transfer-table will be moved to the desired position. Then when stopped the transfer-car may be moved therefrom by throwing the lever 64 in the direction opposite to that in which it was operated in shifting batteries at the battery-carrier and the switch 66 moved in the desired direction to cause the transfer-car to move to the desired charging-rack. When there, the operator will again manipulate such of the shifting hooks 42 or 43 as will effect his purpose and by the movement of the lever 64 cause the battery-tray to be shifted to or from the charging-rack, as desired. From this it will be seen that one operator with one motor may easily and expeditiously effect the transfer of batteries to and from the charging-racks and to and from the battery-carrier, which in turn performs its office with respect to the vehicle requiring a change of batteries. It is evident also that the same arrangement hereinabove described for one floor can be duplicated at any number of floors, in which case the elevator has a longer travel. In such cases there need not be a double set of transfer-tables at each story. Each pair of elevators may go to certain floors only, and the space corresponding to one of the transfer-tables on each side may be divided into charging-racks. The transfer-table may also be located at one end of a charging-room, thereby requiring but one transfer-car at that side of the elevator-shaft.

Many changes in the formation of parts and in their combination and arrangement may be effected without departing from the invention.

I claim as my invention—

1. In a system of transfer for batteries in a charging-station, the combination of a battery-carrier for conveying batteries to and from the position occupied by a vehicle drawn by battery-power, of a transfer-table movable to and from the battery-carrier, a transfer-rack, and a transfer-car adapted to run to and from the transfer-table and the transfer-rack and to carry batteries from said carrier to said rack, substantially as set forth.

2. In a system of transfer for batteries in a charging-station, the combination of a battery-carrier for conveying batteries to and from the position occupied by a vehicle drawn by battery-power, of a transfer-table movable to and from the battery-carrier, a transfer-rack, a transfer-car adapted to run to and from the transfer-table and the transfer-rack and to carry batteries from said battery-carrier to said rack, and motor mechanism upon the transfer-car for automatically shifting batteries between the said battery-carrier and the transfer-car and between the transfer-car and said battery-rack, substantially as set forth.

3. In a system of transfer for batteries in a charging-station, the combination of a battery-carrier for conveying batteries to and from the position occupied by a vehicle drawn by battery-power, of a transfer-table movable to and from the battery-carrier, a transfer-rack, a transfer-car adapted to run to and from the transfer-table and the transfer-rack to carry batteries from said carrier to said rack, and a motor mechanism for shifting batteries to and from the transfer-car and for propelling said car, substantially as set forth.

4. In a system of transfer for batteries in a charging-station, the combination of a battery-carrier for conveying batteries to and from the position occupied by a vehicle drawn by battery-power, of a transfer-table movable to and from the battery-carrier, a transfer-rack, a transfer-car adapted to run to and from the transfer-table and the transfer-rack and to carry batteries from said carrier to said rack, a motor mechanism controlled by the operator on the transfer-car for propelling the transfer-car, substantially as set forth.

5. In a system of transfer for batteries in a charging-station, the combination of a battery-carrier for conveying batteries to and from the position occupied by a vehicle drawn by battery-power, of a transfer-table movable to and from the battery-carrier, a transfer-rack, a transfer-car adapted to run to and from the transfer-table and the transfer-rack and to carry batteries from said carrier to said rack, a motor upon the transfer-car, and mechanism upon the transfer-car and upon the transfer-table through which they may be propelled by said motor and mechanism upon the transfer-car also actuated by said motor whereby batteries may be shifted to and from the transfer-car substantially as set forth.

6. In a system of transfer for batteries in a charging-station, the combination of a battery-carrier for conveying batteries to and from the position occupied by a vehicle drawn by battery-power, of a transfer-table movable to and from the battery-carrier, a transfer-rack, a transfer-car adapted to run to and from the transfer-table and the transfer-rack and to carry batteries from said carrier to said rack, a motor upon the transfer-car, battery-shifting mechanism on said car connected by clutch mechanism with said motor, propelling-gearing for driving said car connected by clutch mechanism with said motor-propelling gearing upon the transfer-table, and means for engaging the latter gearing with that upon the transfer-car, said clutch mechanism being adapted to stand in an intermediate position when the gearing upon the transfer-table is connected to the motor, substantially as set forth.

7. In a system of transfer for batteries in a charging-station, the combination with a series of double battery-racks and lines of way or tracks extending between said racks, of a transfer-car adapted to run upon said tracks and means upon said car for automatically shifting the batteries to and from the racks on either side of the tracks.

8. A transfer-car for batteries provided with shelves or stories adapted to receive and hold upon either side of the car one or more batteries and provided with means for automatically loading and unloading the entire car from either side thereof.

9. A transfer-car for batteries provided with shelves or stories adapted to receive and hold upon either side of the car one or more batteries and provided with a series of hooks adapted to travel across the car and to shift batteries from one side to the other thereof.

10. A transfer-car provided with one or more shelves for receiving batteries or battery-trays, in combination with endless chains mounted to travel across said car, and hooks carried by said chains for moving batteries or battery-trays onto and off from the car.

11. A transfer-car provided with one or more shelves for receiving batteries or battery-trays, in combination with endless chains mounted to travel across said car, hooks carried by said chains for moving batteries or battery-trays onto and off from the car, a motor upon the car for driving said chains, and means for throwing into and out of action any of said hooks.

12. The combination with a battery transfer-car, of battery-moving hooks provided with means for moving them across the car and bars or rods for throwing said hooks out of operable position as desired.

13. The combination with a shelf or rack for receiving batteries or battery-trays, of devices adapted to engage with said batteries or trays for moving them, and means for shifting said devices from one side to the other of said shelf.

14. The combination with a shelf or rack for receiving batteries or battery-trays, of devices adapted to engage with said batteries or trays for moving them, means for shifting said devices from one side to the other of said shelf, and means for throwing one or more of said devices out of operable position during the movement thereof from one side to the other of the car.

15. The combination with a shelf adapted to hold a series of batteries on either edge thereof, of an endless chain mounted on wheels at either edge of said shelf, a block connected to said chains and adapted to move from one edge of the shelf to the other, and hooks carried by said block for moving batteries onto and off from said shelf or across the same.

16. The combination with a shelf adapted to hold a series of batteries on either edge thereof, of an endless chain mounted on wheels at either edge of said shelf, a block connected to said chains and adapted to move from one edge of the shelf to the other, hooks carried by said block for moving batteries onto and off from said shelf or across the same, and bars mounted upon parallel arms and adapted to be raised or lowered so as to throw certain of said hooks out of position for engagement with the batteries or battery-trays.

17. A transfer-car having a series of shelves one above another and each adapted to hold several battery-trays in combination with a set of hooks or hauling devices for each shelf, a motor-shaft for each shelf from which said hooks are moved, a motor upon said car for driving all of said shafts, and means for throwing said hooks into and out of hauling position at will.

18. A transfer-car having a series of shelves one above another and each adapted to hold several battery-trays in combination with a set of hooks or hauling devices for each shelf, a motor-shaft for each shelf from which said hooks are moved, a motor upon said car for driving all of said shafts, horizontal bars extending across said shelves, rock-shafts extending longitudinally of said shelves and provided with arms connected to said bars, and lever mechanism for simultaneously operating one or more sets of said rock-shafts as desired.

19. The combination with a transfer-table, of a shaft in its driving mechanism carrying gear-wheels at its ends, a pivoted bearing for one end of said shaft, a movable bearing for the opposite end thereof, a transfer-car adapted to be carried by said table, a motor on said car and means for shifting the movable bearing on the transfer-table to bring a gear on said shaft into driving relation with said motor.

20. The combination with a transfer-table provided with gearing for driving it, of a transfer-car adapted to be carried by said table, means for stopping said car at a fixed position on said table, a motor on said car and means for coupling said motor to the driving-gear on said table, substantially as set forth.

21. The combination with a transfer-table provided with gearing for driving it, of a transfer-car adapted to be carried by said table, a motor on said car provided with gearing for driving the same, driving-gearing on the transfer-table and means on said car for coupling the gearing of the table to that of the car, substantially as set forth.

22. The combination with a transfer-car, of a motor thereon, mechanism driven from said motor for shifting batteries to and from the car, driving-gearing on said car, means for coupling said gearing to the motor, a transfer-table to receive said car, driving-gearing on said table and means for coupling said gearing to the motor on said car as and for the purpose set forth.

23. In a charging-station for electric batteries the combination with an elevator car or lift adapted to carry such batteries, of a series of floors or stories each equipped with a transfer-table, a transfer-car and one or more charging-racks whereby batteries may be readily carried by said lift to or from any of said floors and readily shifted between the lift and any of the charging-racks on any of the floors.

Signed at New York, in the county of New York and State of New York, this 16th day of April, A. D. 1900.

CYPRIEN O. MAILLOUX.

Witnesses:
DELBERT H. DECKER,
ETHEL L. LAWLER.